United States Patent
Ulichney et al.

(10) Patent No.: US 9,367,776 B2
(45) Date of Patent: Jun. 14, 2016

(54) SYSTEMS AND METHODS FOR TRACING THE SOURCE OF PRINTED PAGES

(75) Inventors: Robert Alan Ulichney, Stow, MA (US);
Shivaun Albright, Rocklin, CA (US);
Matthew D. Gaubatz, Ithica, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 13/989,985

(22) PCT Filed: Jun. 22, 2011

(86) PCT No.: PCT/US2011/041428
§ 371 (c)(1),
(2), (4) Date: May 28, 2013

(87) PCT Pub. No.: WO2012/177249
PCT Pub. Date: Dec. 27, 2012

(65) Prior Publication Data
US 2014/0111831 A1    Apr. 24, 2014

(51) Int. Cl.
| | | |
|---|---|---|
| G06K 15/00 | (2006.01) |
| G06K 15/02 | (2006.01) |
| G06F 21/60 | (2013.01) |
| H04N 1/00 | (2006.01) |
| H04N 1/32 | (2006.01) |
| H04N 1/40 | (2006.01) |

(52) U.S. Cl.
CPC .......... *G06K 15/1889* (2013.01); *G06F 21/608* (2013.01); *G06K 15/1881* (2013.01); *H04N 1/0087* (2013.01); *H04N 1/00846* (2013.01); *H04N 1/00877* (2013.01); *H04N 1/32133* (2013.01); *H04N 1/32256* (2013.01); *H04N 1/32352* (2013.01); *H04N 2201/3202* (2013.01); *H04N 2201/323* (2013.01); *H04N 2201/3205* (2013.01); *H04N 2201/3211* (2013.01); *H04N 2201/3214* (2013.01); *H04N 2201/3215* (2013.01); *H04N 2201/3216* (2013.01); *H04N 2201/3221* (2013.01); *H04N 2201/3223* (2013.01); *H04N 2201/3271* (2013.01)

(58) Field of Classification Search
None
See application file for complete search history.

(56) References Cited

U.S. PATENT DOCUMENTS

| | | | |
|---|---|---|---|
| 7,630,513 B2 | 12/2009 | Alasia et al. | |
| 7,783,109 B2 | 8/2010 | Lapstun et al. | |
| 7,822,969 B2 | 10/2010 | Anglin | |
| 2001/0047476 A1 | 11/2001 | Yen et al. | |
| 2003/0032033 A1* | 2/2003 | Anglin et al. | 435/6 |
| 2006/0029278 A1* | 2/2006 | Alasia et al. | 382/232 |

(Continued)

FOREIGN PATENT DOCUMENTS

| | | | |
|---|---|---|---|
| EP | 0862318 A2 | 9/1998 |
| EP | 1158456 A2 | 11/2001 |
| EP | 1777934 A | 4/2007 |

OTHER PUBLICATIONS

U.S. Appl. No. 12/885,096, filed Mar. 22, 2012, Ulichney et al.

(Continued)

*Primary Examiner* — Quang N Vo
(74) *Attorney, Agent, or Firm* — Fletcher Yoder

(57) ABSTRACT

Methods and systems are provided for tracing the source of a printed document. A method may include receiving a print job for printing a page having page content, generating a log of the print job, encoding the log using a mule image to produce a data-bearing halftone image, merging the data-bearing halftone image with the page content, and printing the merged data-bearing halftone image and page content to produce a printed document.

15 Claims, 6 Drawing Sheets

(56) References Cited

U.S. PATENT DOCUMENTS

| | | | |
|---|---|---|---|
| 2009/0292930 A1* | 11/2009 | Marano et al. | 713/189 |
| 2009/0316950 A1 | 12/2009 | Alasia et al. | |
| 2010/0111301 A1 | 5/2010 | Wanderley | |
| 2011/0069328 A1 | 3/2011 | Ulichney et al. | |

OTHER PUBLICATIONS

U.S. Appl. No. 12/899,476, filed Apr. 12, 2012, Robert Alan Ulichney.

Anan, T. et al.: "Watermaking Technologies for Security-Enchanced Printed Documents," Fujitsu Sci Tec. J., vol. 43, No. 2, pp. 197-203 (Apr. 2007).

Ulichney, R., et al.: "Encoding Information in Clustered-Dot Halftones," HP Laboratories Technical Reports, HPL-2010-0136, Oct. 6, 2010, 4 pgs.

Tuohey, Jr.,: "Government Uses Color Laser Printer Technology to Track Documents," http://www.pcworld.com/article/118664/government_uses_color_laser_printer_technology . . . ; last viewed Jul. 27, 2010), 3 pgs.

* cited by examiner

```
<?xml version="1.0" encoding="UTF-8" ?>
<hpuniversalprint>
            <DocName>Full page photo Pprint</DocName>
            <UserId>sawhite-305531360</UserId>
            <PrinterName>hp color LasrJet 4650
(evoteam4650) </PrinterName>
            <UserName>sawhite</UserName>
            <ComputerName>sawhite-2k3</ComputerName>
            <USERDNSDOMAIN>AMERICAS.CPQCORP.NET</USERDNSDOMAIN>
            <USERDOMAIN>AMERICAS</USERDOMAIN>
            <PrinterAddress?HST_evoteam4650</PrinterAddress>
            <JobId>4</JobId>
            <Pages>1</Pages>
            <Copies>1</Copies>
            <Duplex>0</Duplex>
            <PagesPerSheet>1</PagesPersheet>
            <Date>21:2:56.984 3-18-2010</Date>
```

FIG. 4

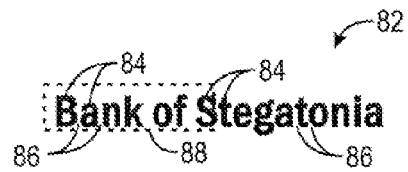

FIG. 5

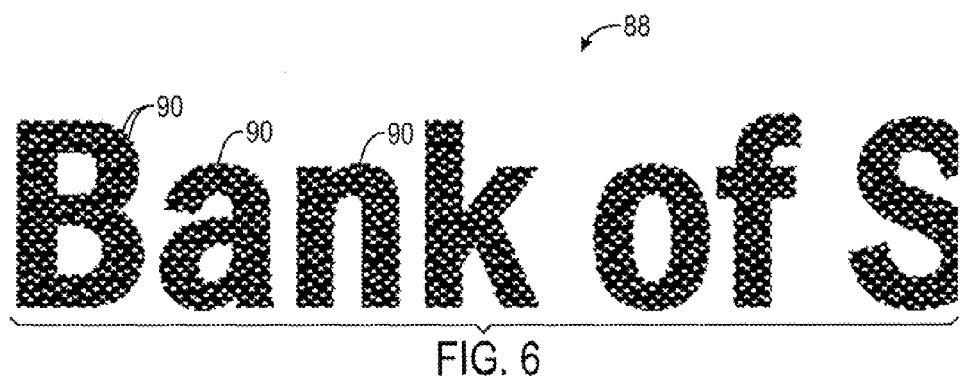

FIG. 6

SYSTEMS AND METHODS FOR TRACING THE SOURCE OF PRINTED PAGES

BACKGROUND

This section is intended to introduce the reader to various aspects of art, which may be related to various aspects of the present disclosure that are described or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices and printers, such as laser printers or inkjet printers, enable the reproduction and copying of documents with relative ease. In secure environments wherein sensitive or confidential documents are routinely handled, it is often desirable to prevent the exposure of such documents through loss, theft, or intentional leaks. Moreover, after a sensitive or confidential document is exposed, it may be desirable to trace the source and identify other information about the exposed document. However, bar codes, special inks, or other techniques for tracing and identifying information about documents may be expensive and disturb the aesthetics of the documents.

BRIEF DESCRIPTION OF THE DRAWINGS

FIG. 4 is an XML file of a print job log in accordance with an embodiment of the present invention;

FIG. 5 is an example of a logo used as a mule image in accordance with an embodiment of the present invention;

FIG. 6 is an enlargement of a portion of the logo of FIG. 5 in accordance with an embodiment of the present invention;

DETAILED DESCRIPTION OF SPECIFIC EMBODIMENTS

Embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include techniques for tracing the source of a printed document. in some embodiments, data from a print job log may be encoded in a printed document using a steganographic halftone. The steganographic halftone may be generated from an input image selected for the purpose of carrying data; this carrier image is referred to as a "mule" image. The steganographic halftone may be merged with page content to produce the printed document. The printed document may be scanned and the print job log data may be recovered from the steganographic halftone.

Figure 1:
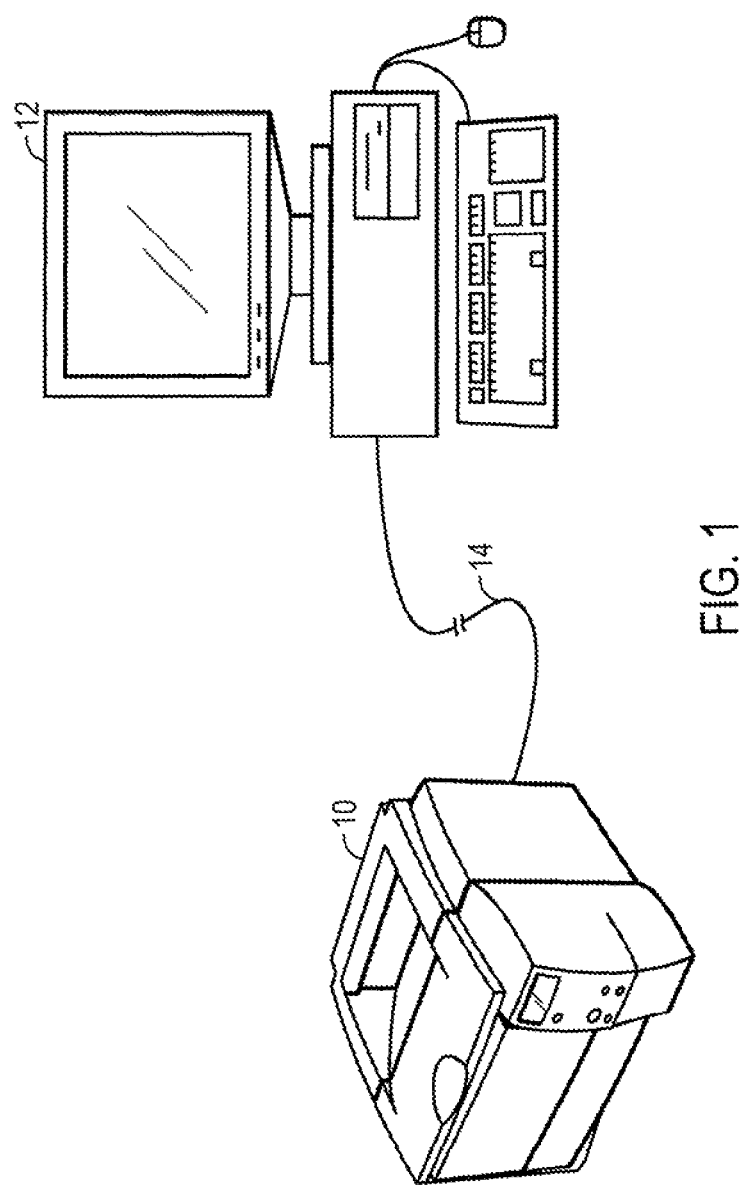
FIG. 1 depicts a printing system and a computer in accordance with an embodiment of the present invention.

FIG. 1 depicts a printing system 10 and a computer 12 in accordance with an embodiment of the present invention. The computer 12 may be coupled to the printing system 10 by a connection 14. The connection 14 may be a wired or wireless network, an interface such as USB, or any other suitable connection. In some embodiments, the printing system 10 may include or print server, and may control the queuing and routing of. Specifically, the computer 12 and the printer 10 are configured to cooperate to perform a process or act individually in accordance with the present embodiments.

Figure 2:
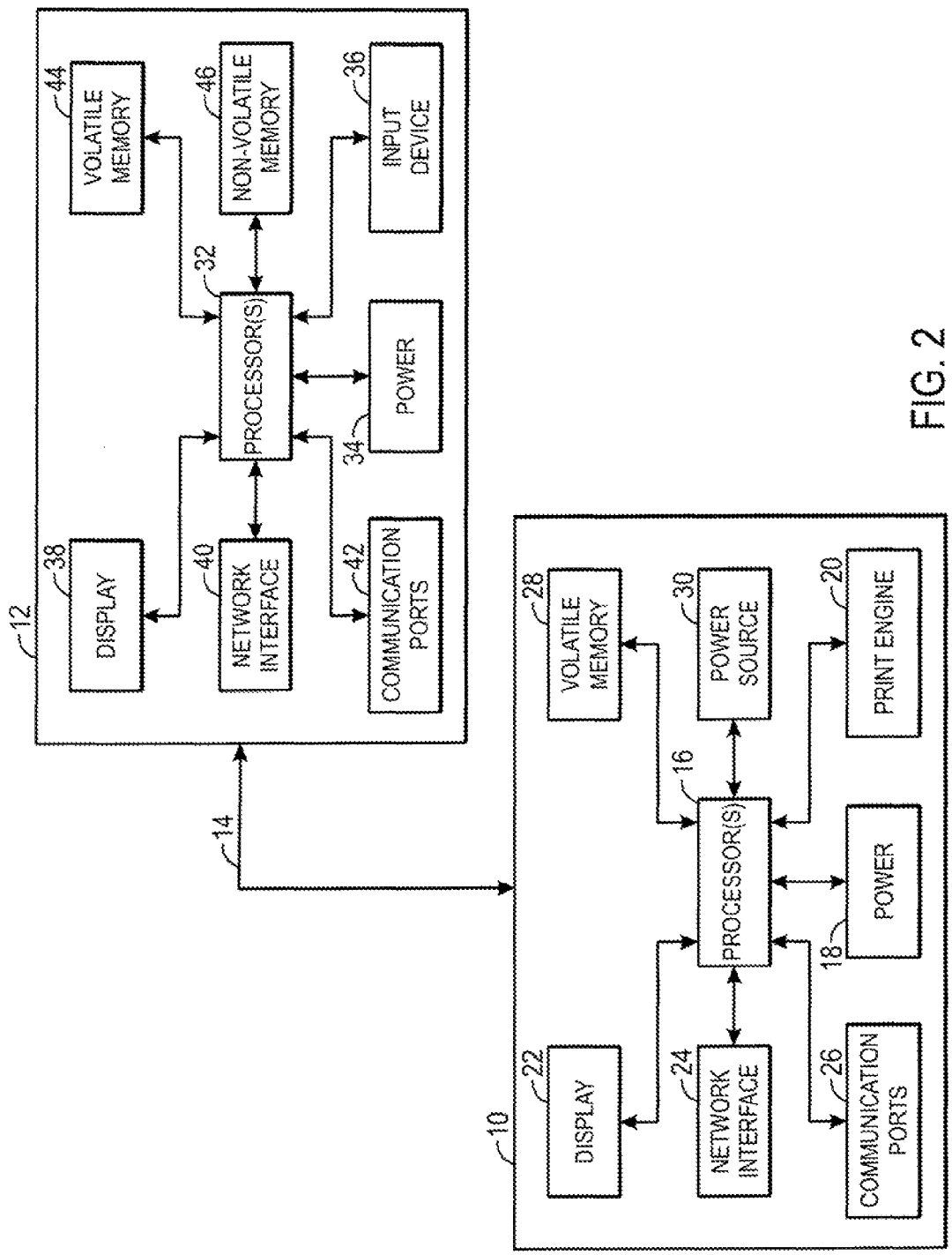
FIG. 2 is a block diagram of the printing system and the computer in accordance with an embodiment of the present invention.

FIG. 2 is a block diagram of the printing system 10 and the computer 1. As described below, in some embodiments the printing system 10 may be a laser printer or any other suitable printing system. The printing system 10 may include a processor 16 that controls the processing of system functions and requests. Additionally, the printer 10 may include a power supply 18, a print engine 20, a display 22, a network interface 24, communication ports 26, a volatile memory 28, and a non-volatile memory 30.

The power supply 18 of the printing system 10 may include an AC adapter, which facilitates connection to the printer 10 to an AC power system as a power source, such as through a wall outlet. The power supply 18 may also include a DC adapter, permanent batteries, replaceable batteries, and/or rechargeable batteries. The display 22 of the printer 10 may include an LCD display, LEDs, or any other suitable display. Furthermore, the printer 10 may include the network interface 24 for communicating over a network, such as a wired or wireless Ethernet network. The printer 10 may also include one or more communication ports 26 for coupling to another device, such as the computer 12, and to a network, such as a local area network, remote area network, intranet, or the Internet, for example.

The processor 16 generally controls the printer 10 by accessing data, such as instructions, stored in tangible, non-transitory, computer-readable media, such as the volatile memory 28 and non-volatile memory 30. The processor 16 may be an image processor, such as a raster image processor, for generating an image for printing. The memories 28 and 30 are operably coupled to the processor 16 to store data and facilitate execution of various programs. For example, the volatile memory 28 may include Dynamic Random Access Memory (DRAM) and/or Static Random Access Memory (SRAM). The non-volatile memory 30 may include a read-only memory (ROM), such as an EPROM, and/or flash memory to be used in conjunction with the volatile memory 28. The memories 28 and 30 may store code or instructions in accordance with present embodiments for implementation by the processor 16.

As mentioned above, the printing system 10 may also include a print engine 20 that may include, for example, a laser, a drum, toner (such as from a cartridge), a fuser, etc., for fusing toner onto a printed page via the laser. As described below, the printing system 10 may produce printed documents via clustered dot halftoning, i.e., the production of continuous toned printed images through the periodic arrangement of dots having different shades or colors.

The computer 12 may include a processor 32 that controls the processing of system functions and requests. The computer 12 may include a number of components that include, for example, a power supply 34, an input device 36, a display 38, a network interface 40, communication ports 42, a volatile memory 44, and a non-volatile memory 46.

The power supply 34 of the computer 12 may include an AC adapter that facilitates connection of the computer 12 to an AC power system as a power source, such as through a wall outlet. The power supply 34 may also include a DC adapter, permanent batteries, replaceable batteries, and/or rechargeable batteries. The input device 36 may be coupled to the processor 32 and may include buttons, switches. a keyboard, a light pen, a mouse, and/or a voice recognition system, for instance. The display 38 may include an LCD display, a CRT. LEDs, and/or an audio display, for example. Furthermore, the computer 12 may include the network interface 40 for communicating over a network, such as a wired or wireless Ethernet network. One or more communication ports 42 may also be coupled to the processor 32. The communication ports 42 may be adapted to be coupled to one or more peripheral devices such as a modem, the printer 12, a computer, or to a network, such as a local area network, remote area network, intranet, or the Internet, for instance.

The processor 32 generally controls the computer 12 by accessing data, such as instructions, stored in tangible, non-transitory computer-readable media, such as the volatile memory 44 and non-volatile memory 46. These memories 44 and 46 are operably coupled to the processor 32 to store data and facilitate execution of various programs. For instance, the processor 32 may be coupled to the volatile memory 44 which may include Dynamic Random Access Memory (DRAM) and/or Static Random Access Memory (SRAM). As mentioned above, the processor 32 may also be coupled to the non-volatile memory 46. The non-volatile memory 46 may include a read-only memory (ROM), such as an EPROM, and/or flash memory to be used in conjunction with the volatile memory 44. Additionally, the non-volatile memory 46 may include magnetic storage such as tape drives, hard disk drives, and the like. The memories 44 and 46 may store code or instructions in accordance with present embodiments for implementation by the processor 32.

Embodiments of the printing system 10 may produce steganographic images, Le., "data-bearing images" particular, the printing system may use halftoning to produce a steganographic image (referred to as a "steganographic halftone" or a "data-bearing halftone image"), such as that described in U.S. patent application Ser. No. 12/563,432 entitled "System and Method for Creating a Data-Bearing Image," now published as U.S. Application Publication No. 2011/0069328, which is hereby incorporated by reference in its entirety. As used in the description of the embodiments below, the term "stegatone" also refers to a steganographic halftone. In such embodiments, using the techniques described herein, the printing system 10 may encode information in a steganographic halftone produced on a page of a printed document, and the encoded information may then be recovered to trace the source of the printed document.

Figure 3:
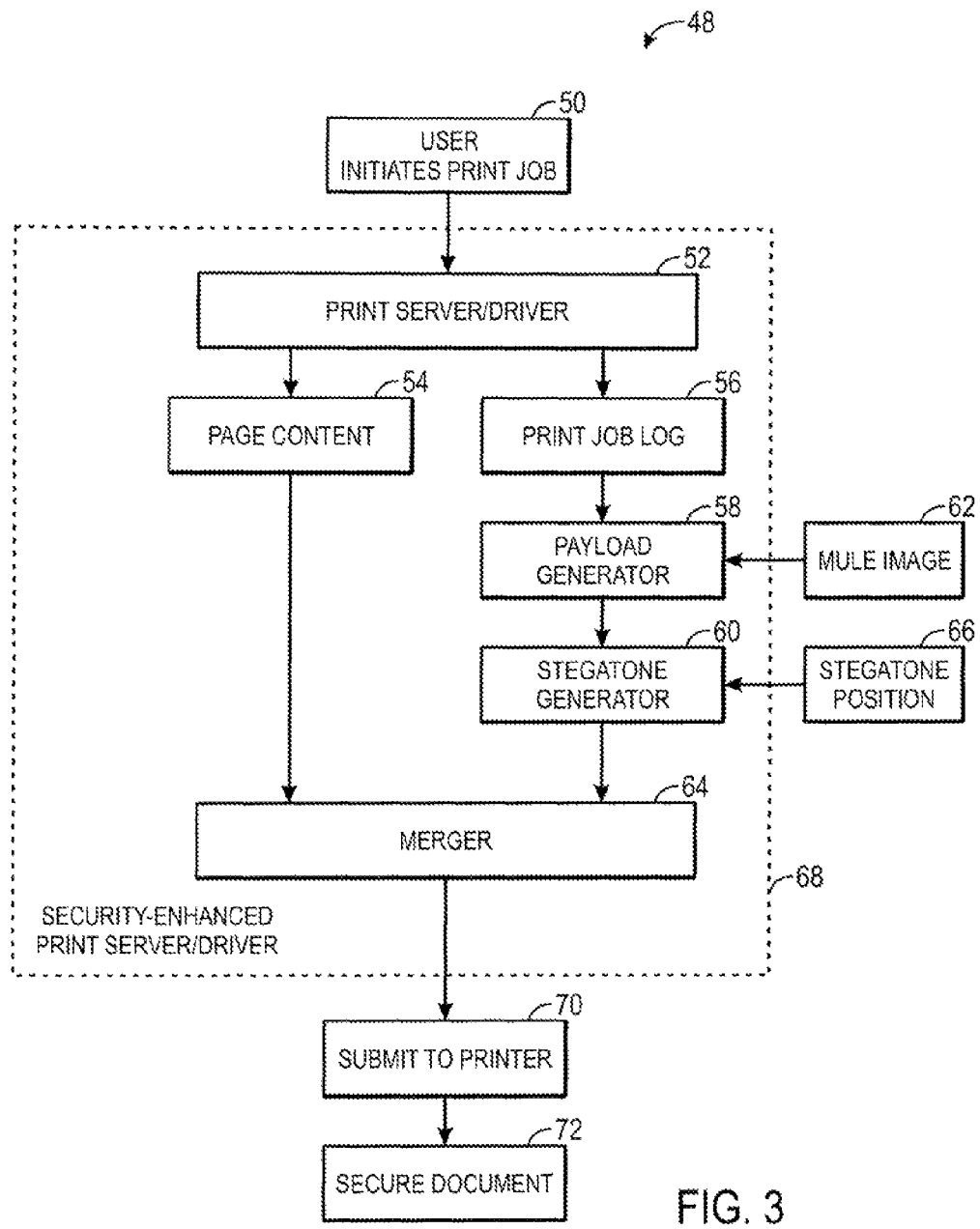
FIG. 3 is a block diagram of a process for encoding information in a printed document through a print job in accordance with an embodiment of the present invention.

FIG. 3 depicts a system 48 implementing a process for encoding information on a printed page through a print job in accordance with an embodiment of the present invention. Some or all of the elements of the system 48 and the corresponding process may be implemented as executable code instructions stored on a non-transitory tangible machine-readable media, such as the volatile memory 44 and non-volatile memory 46 of the computer 12 and executed by the processor 32, or such as the volatile memory 28 and non-volatile memory 30 of the printing system 10 and executed by the processor 16.

Beginning with block 50, a user may initiate a print job to print pages having page content, such as by using or accessing the computer 12. The print job may be received and processed as by a printer server and print driver 52. Processing performed by the print server and print driver 52 may include, for example, authenticating a user, processing the data from the print job into different formats, and so forth. It should be noted that the print server and print driver 52 may be components of the computer 12, and the print server may be configured to execute the print driver to perform processing. The print server and print driver may provide page content 54. Additionally, a print job log 56 may also be provided. The print job log 56 may be processed by a payload generator 58 that packages the data from the print job log 56 that will be embedded in the steganographic halftone. Packaging the data may include compressing and removing non-essential information from the data, such as by removing leading spaces, to produce a packaged data of bits for encoding.

The packaged data ("payload") may then be provided from the payload generator 58 to a stegatone generator 60. The stegatone generator 60 may use a pre-selected input image, i.e., a "mule" image 62, to carry the payload. The payload may be encoded in the mule image using the clustered-dot halftoning technique mentioned above and described in U.S. patent application Ser. No. 12/563,432 entitled "System and Method for Creating a Data-Bearing Image," now published as U.S. Application Publication No. 2011/0069328, which is hereby incorporated by reference in its entirety. Output pixels of the mule image may be rendered as shadow cells (white clusters surrounded by black) and highlight cells (black clusters surrounded by white). The payload may be encoded into a subset of the rendered cells by encoding the information as single pixel shifts of the clusters within each cell. For example, cells that have room for a cluster to move to at least two single pixel shift positions can encode at least one bit of data, and therefore can be defined as "carrier cells." More available shift positions may permit the encoding of more bits within a carrier cell. For example, clusters that can move to eight surrounding positions may encode three bits, clusters that can move to five surrounding positions may encode taro bits, and clusters that can move to three surrounding positions may encode one bit. Additionally. the payload generator 58 may generate the data into different data segments such that each segment may be encoded into a respective "carrier cell" of the mule image.

As described below, the mule image 62 may be selected so that it appears in the same location on every printed page having the page content. For example, mule images may include logos, background images on a page (e.g., watermarks), letter headers, etc. The resulting stegatone (the mule image having the payload encoded therein) may then be submitted to a merger 64 along with the page content 54. The merger 64 functions to merge the page content 54 with the stegatone produced by the stegatone generator 60. The merger 64 may also receive data 66 indicating the position of the stegatone, e.g., the coordinates for placement of the stegatone on the printed page. The system and process described above in blocks 52-66 may be implemented in a security-enhanced print server and print driver 68. For example, in one embodiment the security enhanced print driver 68 may be provided as an add-on to the print server and printer driver 52 and may encompass the functionality of the print server and driver 52. In some embodiments, the security enhanced print driver 68 may be provided as a replacement for a print driver, such as a replacement of the print driver of the computer 12. The merged image may then be provided to the printer 10 (block 70), which may produce a secure document (block 72) that may be traced to the printer 10 and/or the computer 12 using the techniques described below.

As mentioned above, a print job may include a print job log or other data that provides information about the print job, such as the originator of the job, the date and time of the job, and other data. This data may be provided in various formats, such as plain text, markup languages (e.g., XML, HTML, etc.) or other formats. FIG. 4 depicts an XML file 80 of a print job log in accordance with an embodiment of the present invention. The XML file 80 may be produced by a universal print driver, such as one manufactured by Hewlett-Packard, Inc. of Palo Alto, Calif. The XML file 80 may include a number of tags identifying data used and produced by the print job. For example, the tag <hpuniversalprint> may include the following tags: <DocName> identifying the name of the document to be printed; <UserId>identifying the id of the user initiating the print job; <PrinterName> identifying the name of the printer receiving the print job; <UserName> identifying the name of the user initiating the print job; <ComputerName> identifying the name of the computer from which the job initiated; <USERDNSDOMAIN> identifying the DNS domain name from which the job initiated; <USERDOMAIN> identifying the domain, e.g., a directory service domain from which the job initiated; <PrinterAddress> identifying the address of the printer receiving the job; <JobId> identifying the identification number of the print job; <Pages> identifying the number of pages to be printed; <Copies> identifying the number of copies of each page; <Duplex> identifying whether the connection is full duplex or half duplex; <PagesPerSheet> indicating the number of pages to be printed on each sheet of paper; and <DATE> identifying the date and time the print job was initiated.

As mentioned above, in some embodiments, the mule image used for the stegatone may be a logo or other similar image. FIGS. 5 and 6 depict an example of such a mule image in accordance with an embodiment of the present invention. As shown in FIG. 5, the mule image may be a logo 82 having a number of characters 84 separated by whitespace 86. As also described above, the logo 82 may be placed in the same position on each page of a printed document, As will be appreciated, the logo 82 may have a particular data carrying capacity for encoding data. For example, the logo 82 depicted in FIG. 5 may be capable of carrying 448 bytes. Thus, for the XML file 80 depicted above in FIG. 4, the entire 337 bytes of data from this XML file could be encoded in the logo 82. In some embodiments, any additional data carrying capacity may be used for error correction codes.

FIG. 6 depicts an enlargement of a portion 88 of the logo 82 that further illustrates the data encoding described herein. The enlarged portion 88 may include the halftoning of clustered dots 90 to encode the information. Additionally, the quality of the logo 82 or other stegatone may be improved by an edge refinement technique, such as that described in U.S. patent application Ser. No. 12/899,476 entitled "Edge Refinement for Steganographic Halftones," hereby incorporated by reference.

Figure 7:
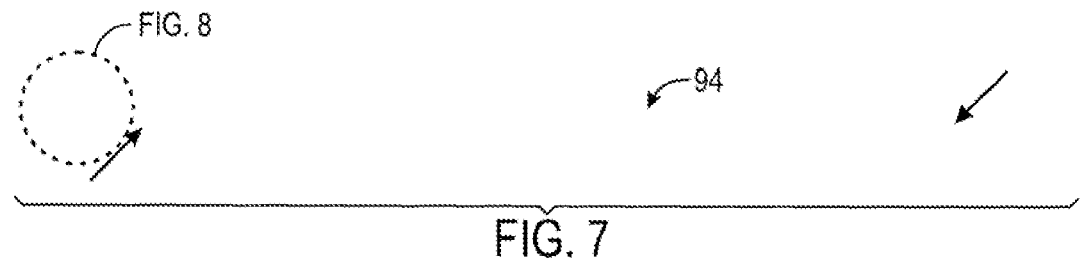
FIG. 7 is an example of a line used as a mule image in accordance with an embodiment of the present invention.

In other embodiments, the mule image may include a nearly invisible or barely visible image, such as a very thin light gray line. Such an embodiment may be useful in implementations that do not use a logo or other suitable mule image. For example, FIG. 7 depicts a thin light gray line mule image 94 that may be used in such an embodiment. The line 94 has a size of 8×4800 pixels, and may have a single gray level. The size of the line may be selected based on its appearance on a printed page as a function of the dots-per-inch (dpi) of the printing system 12. For example, at 600 dpi, the line illustrated in FIG. 7 would appear across the entire width of a letter size page (i.e., 8 inches), and would be ⅓ mm thick. Additionally, as mentioned above, the size of the line 94 may be selected based on the desired carrying capacity of the mule image. For example, the line 94 depicted in FIG. 7 has a carrying capacity of 448 bytes.

Figure 8:
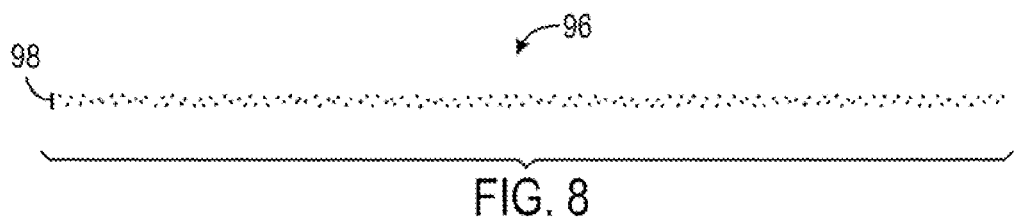
FIG. 8 is an enlargement of a portion of the line of FIG. 7 in accordance with an embodiment of the present invention.

FIG. 8 depicts an enlarged portion 96 of a stegatone of the line 94 having encoded data in accordance with an embodiment of the present invention. As shown in FIG. 8, the enlarged portion 96 may include halftoned clustered dots for encoding of data in the stegatone. Additionally, in some embodiments, the line 94 or other mule image may include alignment fiducials 98, such as the 1-pixel wide column of black pixels shown in FIG. 7. The fiducials 98 may aid in aligning the stegatone during the recovery of the encoded data. in some embodiments, the line 94 or other barely visible or nearly invisible stegatone may be placed at the bottom, the top, or the sides of a page of a printed document. In such embodiments, the area for the stegatone may be removed from the printable are of the page to ensure that none of the page content overlaps the stegatone.

Figure 9:
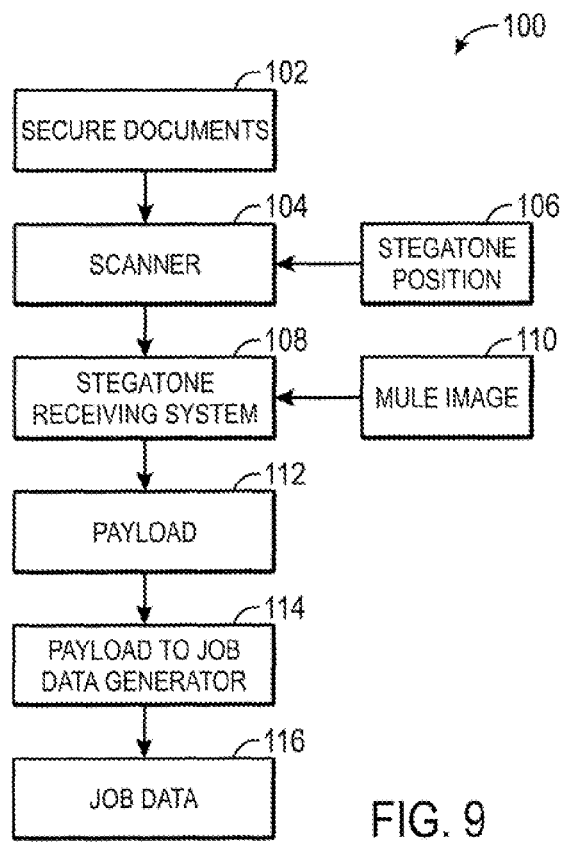
FIG. 9 is a block diagram of a process for recovering encoded data from a stegatone in accordance with an embodiment of the present invention.
Figure 10:
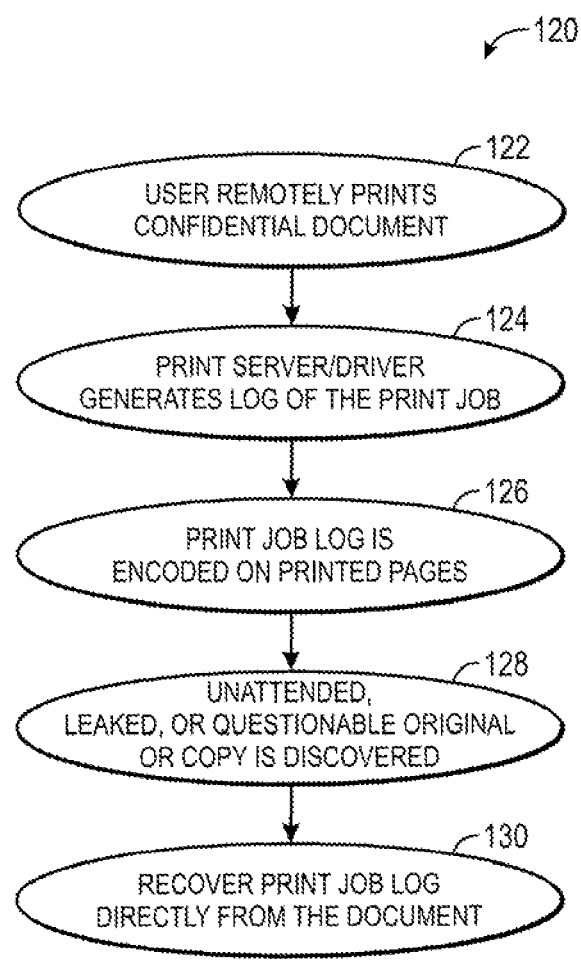
FIG. 10 is a block diagram of a process for securing and tracing the source of a printed document in accordance with an embodiment of the present invention.

FIG. 9 depicts a system 100 implementing a process for recovering encoded data from a stegatone in accordance with an embodiment of the present invention. Some or all of the element of the system 100 and corresponding process may be implemented as executable code instructions stored on a non-transitory tangible machine-readable media, such as the volatile memory 44 and non-volatile memory 46 of the computer 12 and executed by the processor 32, or such as the volatile memory 28 and non-volatile memory 30 of the printing system 10 and executed by the processor 16.

Initially, secure documents 102 may be created using the techniques described above, such that the secure documents 102 include encoded data of the print job that resulted in printing the documents. The secure documents 102 may be provided to a scanner 104. The scanner 104 may receive, as input, data indicating the position 106 of the stegatone, e.g., the coordinates of the stegatone on a page. The scanner 104, which is utilized for scanning the secure documents 102 to produce scanned data, may be an inline scanner or other suitable scanner. The scanned data may be provided to a stegatone recovery system 108, such as that described in U.S. patent application Ser. No. 12/885,096 titled "System and Method for Recovering a Data-Bearing Image," which is hereby incorporated by reference, The stegatone recovery system 108 may receive, as input, a mule image 110 to provide a basis for recovering the encoded image The stegatone recovery system 108 may then produce a payload 112, i.e., which includes aspects of the data encoded in the original mule image of the secure documents 102. Next, a payload to job data generator 114 may generate print job data 116 may be generated from the payload 112. The print job data 116 may then be analyzed to determine the source of the secure documents 102. such as the identity of the user who printed the document or other information captured by the print job.

Finally, FIG, 10 depicts a process 120 for securing and tracing the source of a printed document in accordance with an embodiment of the present invention. Initially, a user may print a document (block 122), such as a confidential document, using the computer 12 and the printing system 10. The printer server and print driver may generate a log of the print job (block 124), such as that described above in FIG. 3, that includes the user who printed the documents, the computer that printed the document, the date and time of the printing, etc. The print job log data may then be encoded in the printed document in a stegatone (block 126), such as a logo, line or other suitable image. Next, a leaked, stolen, lost, or otherwise unauthorized original of the document may be discovered (block 128), The print job log data may then be recovered from the document (block 130), using the process 100 described above in FIG. 9, to determine who or what printed the documents, such as by using the user, date and time, and other information stored in the print job log.

What is claimed is:

1. A method, comprising:
   receiving a print job for printing on a particular printer a page having page content;
   generating a log of the print job, the log identifying a user from whom the print job was received, the particular printer on which the print job is to be printed, a date at which the print job was received, and a computing device on which the user generated the print job;
   encoding the log using an input image to produce a data-bearing halftone image;
   merging the data-bearing halftone image with the page content; and
   printing using the particular printer the merged data-bearing halftone image and page content to produce a printed document from which identification of the user, identification of the particular printer, the date, and identification of the computing device are retrievable to trace the printed document.

2. The method of claim 1, wherein the input image comprises a logo.

3. The method of claim 1, wherein the input image comprises a rectangle with a single gray level.

4. The method of claim 1, wherein merging the data-bearing halftone image with the document comprises receiving a position of the data-bearing halftone image on the page.

5. The method of claim 1, wherein the log of the print job comprises the identify of the user who initiated the print job, the date and time of the print job, or any combination thereof.

6. The method of claim 1, wherein the data-bearing halftone image comprises an alignment fiducial.

7. The method of claim 6, wherein merging the data-bearing halftone image comprises aligning the alignment fiducial with a position in the page.

8. The method of claim 1, wherein the data-bearing halftone image comprises a plurality of carrier cells, wherein each carrier cell includes a pixel cluster and at least two shift positions to which the pixel cluster can be shifted.

9. The method of claim 1, wherein the log comprises an XML file.

10. A method, comprising
    scanning a printed document having a data-bearing halftone image;
    receiving a position of the data-bearing halftone image on the printed document;
    receiving an input image from which the data-bearing halftone image was generated;
    recovering data from the data-bearing halftone image based on the input image; and
    tracing the printed document by generating a print job log from the recovered data, including identification of a user from which a print job was received that resulted in the printing of the printed document, identification of a particular printer on which the print job was printed, a date at which the print job was received, and identification of a computing device on which the user generated the print job.

11. The method of claim 10, comprising determining a user who printed the printed document based on the print job log.

12. The method of claim 10, comprising determining the date and time the printed document was printed based on the print job log.

13. The method of claim 10, wherein scanning the printed document comprising scanning only that portion of the printed document having the data-bearing image based on the position of the data bearing image on the printed document.

14. The method of claim 10, comprising determining the alignment of the data-bearing image based on an alignment fiducial of the data-bearing image.

15. A non-transitory computer-readable medium storing a computer program executable by a processor to perform a method comprising:
    receiving a print job comprising: an identification of a user that generated the print job, page content that is to be printed, an identification of a computing device at which the user generated the print job, an identification of a particular printer on which the user has specified that the page content is to be printed;
    in response to receiving the print job:
       generating a data-bearing halftone image by encoding within an input image the identification of the user, the identification of the computing device, the identification of the particular printer, and a date at which the print job was received;
       adding the data-bearing halftone image to the page content; and
       printing the page content to which the data-bearing halftone image has been added using the particular printer to generate a printed document from which the identification of the user, the identification of the computing device, the identification of the particular printer, and the date are detectable to trace the user that generated the print job, the computing device at which the user generated the print job, the particular printer that printed the page content, and the date at which the print job was received for printing.

* * * * *